United States Patent Office 3,124,583
Patented Mar. 10, 1964

3,124,583
SUBSTITUTED DERIVATIVES OF 3-AZA-6,7-BENZO-8 - OXA - 5 - PHENYLBICYCLO[3.3.1]-NONANE
Harold Elmer Zaugg, Lake Forest, and Robert W. De Net, Waukegan, Ill., assignors to Abbott Laboratories, North Chicago, Ill., a corporation of Illinois
No Drawing. Filed Jan. 15, 1962, Ser. No. 166,392
5 Claims. (Cl. 260—294.7)

This invention relates to novel chemical compounds of the formula

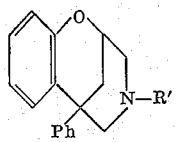

and methods for their preparation. In this and succeeding formulas, Ph represents phenyl and R' is hydrogen, methyl, cinnamyl or β-hydroxy-γ-phenoxypropyl. These compounds are effective analgesics and barbiturate potentiators. In a representative operation, mice were first injected intraperitoneally for 30 minutes with 3-aza-6,7-benzo-8-oxa-5-phenylbicyclo[3.3.1]nonane at a dosage of 18 mg./kg. and then challenged with an intraperitoneal injection of 60 mg./kg. of sodium pentobarbital. It was found that the duration of sleep compared to the controls injected only with the barbiturate increased 92%.

The compound wherein R' is hydrogen can be prepared as a free base or hydrochloride by the catalytic reduction of 3-aza-6,7-benzo-3-benzyl-8-oxa-5-phenylbicyclo[3.3.1]nonane or its hydrochloride with hydrogen in the presence of 5% palladium on charcoal in 50% aqueous ethanol at about 40° C. When the hydrogen uptake is complete, the catalyst is removed, the filtrate concentrated to dryness and the residue recrystallized from ethanol or other suitable solvent to obtain the desired product.

The compounds wherein R' is methyl, cinnamyl or β-hydroxy-γ-phenoxypropyl can be prepared by refluxing equimolar amounts of 3-aza-6,7-benzo-8-oxa-5-phenylbicyclo[3.3.1]nonane with formic acid and formaldehyde, cinnamyl chloride or 1,2-epoxy-3-phenoxypropane, respectively in benzene or other inert solvent and in the presence or absence of an acid acceptor such as triethylamine or pyridine. The desired products are then isolated in a conventional manner as described in the examples which follow. These examples are presented to illustrate rather than limit the invention. It is to be understood that acid addition salts of the new compounds can be readily obtained by the reaction of their free bases with ethereal hydrogen chloride, hydrogen bromide, sulfuric acid, phosphoric acid and the like in a manner well known to those skilled in the art.

EXAMPLE 1

3-Aza-6,7-Benzo-8-Oxa-5-Phenylbicyclo[3.3.1]Nonane

The hydrochloride of 3-aza-6,7-benzo-3-benzyl-8-oxa-5-phenylbicyclo[3.3.1]nonane melting at 146° C. (6.7 g., 0.017 mole) was dissolved in 200 ml. of 50% aqueous ethanol and catalytically hydrogenated in the presence of 8 g. of 5% palladium on charcoal at 40° C. with an initial hydrogen pressure of 40 pounds per square inch. Hydrogen uptake was complete in 2 hours after which the catalyst was removed by filtration and the filtrate was concentrated to dryness. After recrystallization from ethanol, the desired product in the form of its hydrochloride melted at 305°–307° C. with decomposition and contained 4.88% nitrogen compared to the calculated value of 4.87% nitrogen. The free base melted at 129°–130° C.

EXAMPLE 2

3-Aza-6,7-Benzo-3-Methyl-8-Oxa-5-Phenylbicyclo-[3.3.1]Nonane

A mixture of 5 g. (0.02 mole) of the free base of 3-aza-6,7-benzo-8-oxa-5-phenylbicyclo[3.3.1]nonane, 20 ml. of 90% formic acid and 15 ml. of 40% formaldehyde was refluxed overnight. Twenty-five ml. of dilute hydrochloric acid was then added, the reaction mixture concentrated to dryness and the residue made alkaline with 25% aqueous sodium hydroxide solution. The precipitated base was taken up in ether and dried over anhydrous magnesium sulfate. Filtration and removal of the ether by distillation resulted in a glassy residue which when recrystallized twice from ethanol produced the desired product melting at 133°–134° C. which analyzed 5.17% nitrogen compared to the calculated value of 5.28% nitrogen.

EXAMPLE 3

3-Aza-6,7-Benzo-3-Cinnamyl-8-Oxa-5-Phenylbicyclo-[3.3.1]Nonane

A solution of 5.5 g. (0.02 mole) of 3-aza-6,7-benzo-8-oxa-5-phenylbicyclo[3.3.1]nonane, 3.35 g. (0.02 mole) of cinnamyl chloride and 2.22 g. (0.02 mole) of triethylamine in 200 ml. of dry benzene was refluxed overnight. The cooled reaction mixture containing precipitated triethylamine hydrochloride was washed with water and the benzene was removed from the organic layer by distillation. The residue was taken up in dry ether, filtered and treated with excess ethereal hydrogen chloride. The solid which precipitated was collected and recrystallized from isopropyl alcohol to obtain the hydrochloride of the desired product melting at 203°–204° C. with decomposition.

Analysis.—Calc'd for $C_{26}H_{26}ClNO$: C=77.31%; H=6.49%; N=3.47%. Found: C=77.52%; H=6.29%; N=3.53%.

EXAMPLE 4

By substituting an equimolar amount of 1,2-epoxy-3-phenoxypropane for the cinnamyl chloride of Example 3 and omitting the triethylamine, there was obtained 3-aza-6,7 - benzo - 3 - (β - hydroxy - γ - phenoxypropyl) - 8-oxa-5-phenylbicyclo[3.3.1]nonane hydrochloride melting at 193°–195° C. after recrystallization from ethanol-ether. This product was found to contain 3.49% nitrogen compared to the calculated value of 3.20% nitrogen.

3 - aza - 6,7 - benzo - 3 - benzyl - 8 - oxa - 5 - phenylbicyclo[3.3.1]nonane employed as a starting material in the present invention can be prepared by reacting benzylamine with methyl cis-2-bromomethyl-4-phenyl-4-chromancarboxylate at steam bath temperature and thereafter reducing the intermediate thus formed with ethereal lithium aluminum hydride at the reflux temperature of the reaction mixture. Methyl cis-2-bromomethyl-4-phenyl-4-chromancarboxylate in turn is prepared by the reaction at room temperature of equimolecular proportions of sodium methoxide in methanol and the diastereoisomer of 3-(2',3'-dibromopropyl)-3-phenyl-2-benzofuranone melting at 99°–101° C. Upon completion of the reaction, the desired product is isolated by cooling the reaction mixture followed by filtration and after recrystallization from methanol melts at 108° C. The reaction of 3-allyl-3-phenyl-2-benzofuranone with an equimolecular proportion of bromine in chloroform at a temperature of about 0° C. followed by removal of the chloroform and subsequent fractional crystallization from absolute alcohol results in the formation of one diastereoisomer of 3-(2',3'-dibromopropyl) - 3 - phenyl-2-benzofuranone melting at 99°–101° C. and another diastereoisomer melting at 137°–138° C.

What is claimed is:
1. A compound selected from the group consisting of compounds of the formula

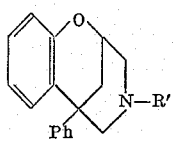

and their non-toxic, pharmaceutically acceptable, acid-addition salts wherein Ph is phenyl and R' is a member of the group consisting of hydrogen, methyl, cinnamyl and β-hydroxy-γ-phenoxypropyl.

2. 3-aza-6,7-benzo-8-oxa-5-phenylbicyclo[3.3.1]nonane.
3. 3-aza-6,7-benzo - 3 - methyl - 8 - oxa - 5 - phenylbicyclo[3.3.1]nonane.
4. 3-aza-6,7-benzo - 3 - cinnamyl - 8 - oxa - 5 - phenylbicyclo[3.3.1]nonane.
5. 3-aza-6,7-benzo - 3 - (β - hydroxy-γ-phenoxypropyl)-8-oxa-5-phenylbicyclo[3.3.1]nonane.

No references cited.